United States Patent
Krupa

[11] Patent Number: 6,027,102
[45] Date of Patent: Feb. 22, 2000

[54] HYDRAULIC JACK STAND

[76] Inventor: Richard P. Krupa, 7222 W. 500 N., Ligonier, Ind. 46767

[21] Appl. No.: 09/061,121

[22] Filed: Apr. 16, 1998

Related U.S. Application Data

[60] Provisional application No. 60/044,500, Apr. 21, 1997.

[51] Int. Cl.[7] ....................................................... B66F 3/36
[52] U.S. Cl. .......................................... 254/93 R; 254/134
[58] Field of Search ................................ 254/93 H, 93 R, 254/133, 134, 100, DIG. 1, DIG. 4, DIG. 5

[56] References Cited

U.S. PATENT DOCUMENTS

| | | | |
|---|---|---|---|
| 685,011 | 10/1901 | Tell | 254/134 |
| 737,133 | 8/1903 | O'Brien | 254/134 |
| 3,851,856 | 12/1974 | Berg | 254/93 R |
| 3,902,699 | 9/1975 | Brackett | 254/93 R |
| 4,221,362 | 9/1980 | Van Santen | 254/133 A |
| 4,793,592 | 12/1988 | Green et al. | 254/134 |
| 5,215,288 | 6/1993 | Lyon | 254/134 |
| 5,388,808 | 2/1995 | Latire | 254/93 R |

*Primary Examiner*—Robert C. Watson
*Attorney, Agent, or Firm*—Taylor & Aust, P.C.

[57] ABSTRACT

A pedestal supported hydraulic jack arrangement, and a kit for adapting a commercially available hydraulic bottle jack to use at selectively adjustable relatively elevated locations includes a first elongated hollow tubular member having a floor engaging based fixed on one end thereof and at least one transverse aperture extending therethrough near the other end thereof. A second elongated tubular member having a first set of generally parallel generally equally spaced transverse apertures and a second set of generally parallel generally equally spaced transverse apertures generally orthogonal to the first set. The second elongated member has a transverse dimension sufficiently small that it may be telescopically slidingly positioned inside the first hollow tubular member. There is a jack adapter plate fixed to one end of the second elongated tubular member, and a plurality of bolts for fastening a hydraulic jack to the jack adapter plate. A pin adapted to extend simultaneously through one transverse aperture of each tubular member to fix the relative locations of the first and second elongated tubular members. There is an optional saddle for adapting an object engaging end of a movable ram portion of a hydraulic jack to support a convexly curved heavy object. The saddle has an upwardly opening convex rest and a downwardly opening hollow cylindrical adapter for passing over and laterally securing the saddle to the object engaging end of the ram.

6 Claims, 2 Drawing Sheets

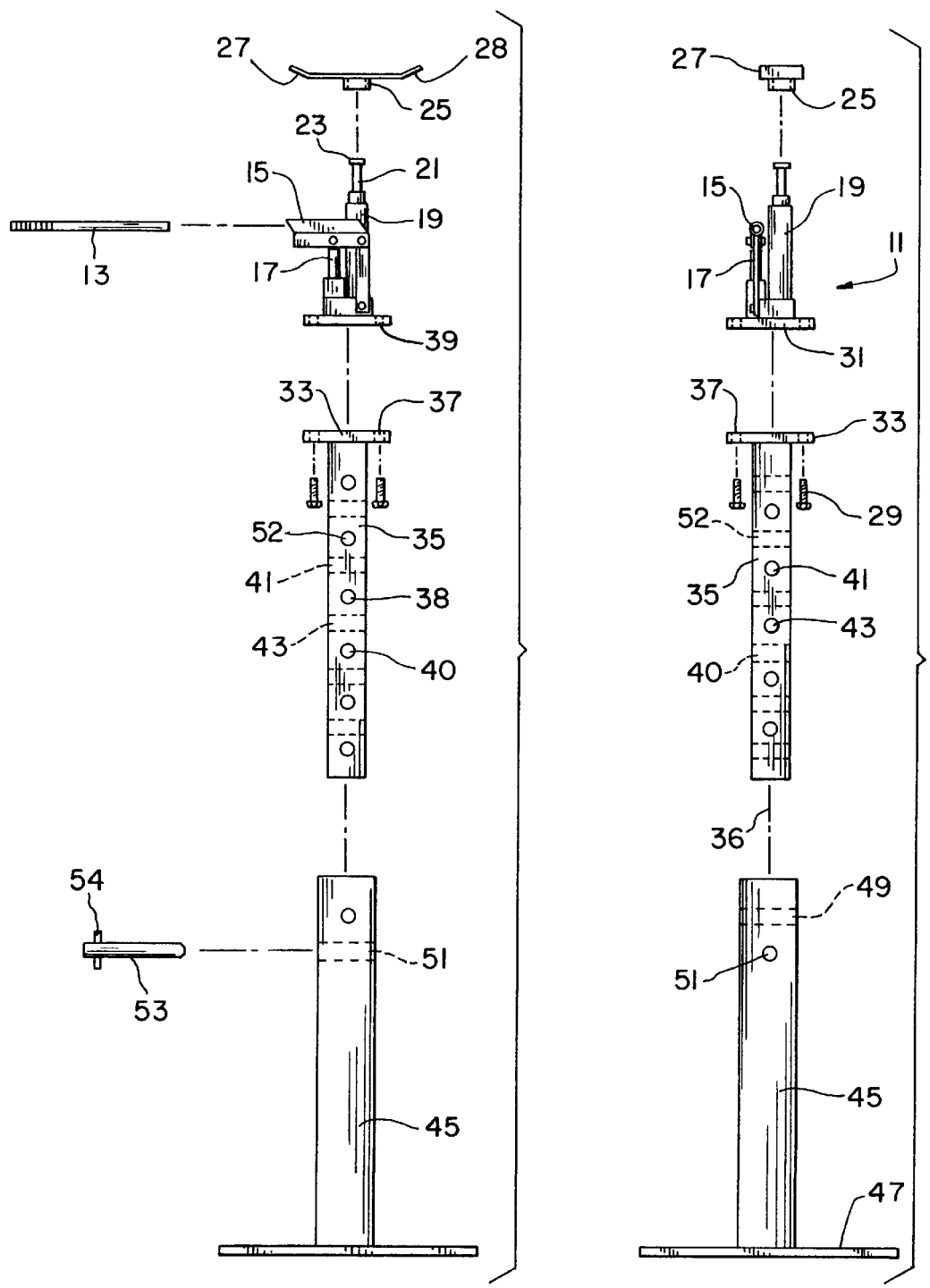

HYDRAULIC JACK STAND

CROSS-REFERENCE TO RELATED APPLICATIONS

This application claims the benefit of U.S. Provisional Application No. 60/044,500 filed Apr. 21, 1997.

SUMMARY OF THE INVENTION

The present invention related generally to jacking devices for raising heavy objects and more particularly to such jacking devices for further raising already elevated heavy objects. In particular, the present invention provides a device for raising vehicle components on vehicles resting on a raised hydraulic lifts.

Several lifting devices for already elevated objects are known. For example, a pedestal transmission jack comprises a hydraulic ram jack supported at an elevated location on a four leg castered base. The lift range of this device is relatively limited, for example, between 50–70 inches, and the heavy weight and large base makes it nearly impossible to use in a pit beneath a lift.

Hydraulic under hoist utility jacks having a conventional floor supported jack with an adjustable pipe arrangement extending upwardly from the movable top of the jack are also known. These devices, which are essentially extensions to the upper end of a conventional jack improve the lift range as compared to the previously mentioned transmission jack, but are extremely difficult to use since the upper end of the jack must be accurately located while the jack is being raised by operating the jack handle, which is located about six feet beneath the jack upper end, to engage the heavy object.

The hydraulic jack stand of the present invention is a hydraulic jack mounted on the upper end of an adjustable stand. It is made of two pipes, one telescopically received inside the other, with holes drilled in both pipes to vary the height of the stand. A pin extending through one hole of each pipe holds the jack in position at the desired height.

This tool is well suited to use by mechanics when a vehicle is on a lift in a repair shop. It is used under the vehicle. Examples of uses are: to lift or lower an engine or hold an engine in position while removing or installing an oil pan or motor mounts, or to lower or raise an engine to remove or install a transmission; also to hold a transmission in place to remove or install an engine. The hydraulic jack stand can be used to hold exhaust pipes in place, or a drive shaft in place while removing or installing the shaft.

The hydraulic jack stand of the present invention is light weight and can be moved about easily. It does not take up much room while under the vehicle, and is easy to work around while in use; air hoses and electrical cords can not get caught on the stand because of its design. This tool is safe, because the operator can control the jack while at the work being done, instead of raising or lowering a lift the vehicle is on onto a stationary stand, which is very dangerous.

Among the several objects of the present invention may be noted the provision of an easily deployed jack stand for use beneath hydraulic lifts; the provision of a kit for assembling a jack stand; the provision of a hydraulic jack arrangement where the hydraulic portion thereof is located relatively close to the objecting to be raised thereby facilitating operation by one person; the provision of a jack stand which located a hydraulic jack at an elevated location close to an object to be raised; and the provision of a hydraulic jack stand which may be positioned in a pit beneath a vehicle.

These as well as other objects and advantageous features of the present invention will be in part apparent and in part pointed out hereinafter.

In general, a pedestal supported hydraulic jack arrangement has a floor engaging base with a hollow tubular member fixed thereto and extending upwardly therefrom. A second selectively movable tubular member is telescopically received in the hollow tubular member generally coaxial therewith. The movable tubular member may be selectively positioned at a any one of several different discrete locations along the axis relative to the hollow tubular member. The movable tubular member includes a first set of generally parallel generally equally spaced transverse apertures and a second set of generally parallel generally equally spaced transverse apertures which extend generally orthogonally to the first set. The hollow tubular member includes at least one, and preferably two, transverse apertures which are selectively alignable with any aperture of the first and second sets. A steel pin may then be simultaneously passed through one aperture in each tubular member to fix the elevation of the hydraulic jacking structure at a preferred level. A hydraulic jacking structure such as a commercially available hydraulic bottle jack has a base fixed to an upper end of the movable tubular member and an upwardly extending ram movable continuously throughout a limited longitudinal range along the common axis. The primary function of the hydraulic jack arrangement is to further raise already substantially elevated heavy object such as vehicle components already located on conventional hydraulic lifts.

BRIEF DESCRIPTION OF THE DRAWING

FIG. 1 is an exploded side view of a hydraulic jack stand according to my invention in one form;

FIG. 2 is an exploded end view of the hydraulic jack stand from the right side of FIG. 1;

Corresponding reference characters indicated corresponding parts throughout the several views of the drawing.

Figure 3:
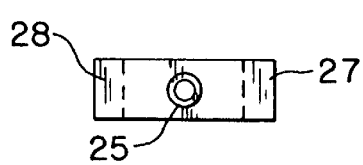
FIG. 3 is top view of the upper jack saddle of FIGS. 1 and 2.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

FIGS. 1 and 2 are exploded side and end view respectively of a pedestal supported hydraulic jack arrangement for further raising already substantially elevated heavy objects according to the present invention. The jack 11 may be a commercially available hydraulic bottle jack of the type where hydraulic fluid from a relatively small diameter master cylinder is pumped to a relatively larger diameter slave cylinder 19 to raise the ram 21. A handle 13 fits into the socket 15 and is actuated to reciprocate the piston 17 achieving the pumping action. The upper end of ram 21 includes a circular foot 23 which normally engages an object to be raised. The base 31 of the jack 11 has holes such as 39 tapped therein.

A floor engaging base 47 has a hollow tubular member 45 fixed thereto as by welding. The tube 45 has an axis 36 extending upwardly from the base. Typically tube 45 is circular in cross-section, but other configurations such as square are quite acceptable. A second or selectively movable tubular member 35 shares the axis 36 when telescopically received in the hollow tubular member. Of course, the roles of the tubular members 35 and 45 may be reversed with the inner one fixed to the base so long as the outer tubular member is hollow to receive the inner one. Similarly, the spaced plurality of holes may be in either member or those holes may be distributed between the members. A pin 53 is provided for selectively fixing the movable tubular member 35 at a selected one of several different discrete locations along the common axis 36 relative to the hollow tubular member 45. The hydraulic jacking structure 11 has a base 31 fixed to an upper end of the movable tubular member 35 by bolts such as 29 and an upwardly extending ram 21 which is movable continuously throughout a limited longitudinal range along the common axis 36. Movable tubular member 35 includes a first set of generally parallel generally equally spaced transverse apertures such as 41 and 43, and a second set of generally parallel generally equally spaced transverse apertures such as 38, 40 and 52. One set of apertures extends generally orthogonal or perpendicular to the other set. The hollow tubular member 45 includes at least one transverse aperture, 49 or 51 which may be selectively aligned with any aperture of the first and second sets. A pin 53 is provided for passing through the aligned apertures to fix the elevation of the hydraulic jacking structure at a preferred level. Only one aperture is necessary in tube 45, but two orthogonal apertures provide both enhanced user convenience when repositioning the pin and relative close spacing of contiguous discrete locations.

Figure 5:
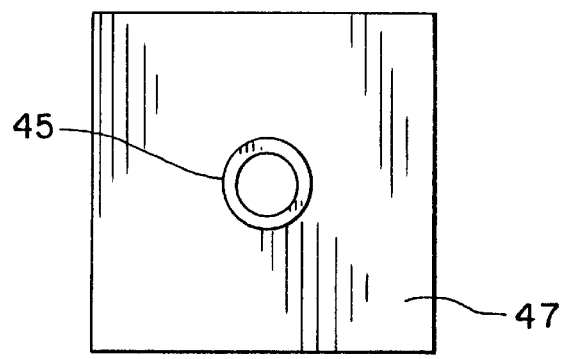
FIG. 5 is a top view of the fixed tube and base of the jack stand of FIGS. 1 and 2.

In one presently preferred particular embodiment, the hydraulic jack stand includes a hydraulic jack 11 (1½ ton or 2 ton capacity) mounted on an adjustable stand consisting of two pipes 35, 45 (one inside the other) with holes drilled on 4 sides of pipe 35 at approximately 3 inch increments to vary the height of the stand. A pin 53 holds the upper portion 35 and 11 in place on the lower portion 45 as shown in FIGS. 1 and 2. The bottom part of FIGS. 1, 2 and 5 is a 2 inch black iron pipe 45 (or any tube of appropriate diameter), welded perpendicular to a ⅛ inch plate 47 which is 9½ inches square as seen in FIG. 5. The bottom part has two sets of holes drilled at 90 degrees through the pipe at the top about 2 inches apart to support a 1½ inch pipe 35 (and the upper portion of the jack stand) at various positions or heights as desired. The upper pipe 35 has ¹¹⁄₁₆ inch diameter holes such as 40 and 43 drilled 3½ inches apart on 4 sides 90 degrees opposite the other.

Assuming only one hole such as 49 in pipe 45, it is important that the longitudinal spacing between adjacent apertures in one set (seven inches in this embodiment) is less than twice the limited longitudinal range of the movable ram or that the longitudinal spacing between contiguous orthogonal holes (three and one-half inches) be less that the ram range so that all the various heights within the limits of the device are achievable.

The length of the pipe 35 is about 32 inches and pipe 45 is of a comparable length. This allows a minimum height of 4 foot 8 inches and a maximum height of 7 foot one inch. It is preferred that the maximum preferred level of the hydraulic jacking structure be at least on the order of six feet. The limited longitudinal range or extension of the ram 21 depends of the commercial jack employed, but is typically 6 to 8 inches. In almost all cases, the maximum preferred level of the hydraulic jacking structure is at least six times the limited longitudinal range of the movable ram 21.

The provision of orthogonally located spaced holes in both tubes is primarily for user convenience, but it also may provide a more fine discrete incremental adjustment. As examples, if pin 53 is removed from holes 41 and 49 and the tube 35 lowered 2 inches and rotated 90 degrees, the holes 41 and 51 are now aligned and may be pinned, thus providing a 2 inch increment. However, if pin 53 is removed from holes 41 and 49 and the tube 35 lowered 3½ inches and rotated 90 degrees, the holes 49 and 52 are now aligned and may be pinned, thus providing a 3½ inch increment. Again, if pin 53 is removed from holes 41 and 49 and the tube 35 raised 1½ inches the holes 38 and 51 are now aligned and may be pinned, thus providing a 1½ inches increment. Numerous other possibilities including additional and/or non-uniformly spaced holes should now be apparent.

Figure 6:
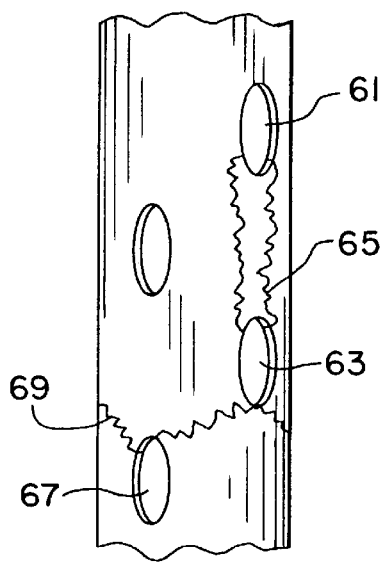
FIG. 6 is a side view of a portion of the movable tube of FIGS. 1, 2 and 4 illustrating how fractures of the tube could occur.
Figure 7:
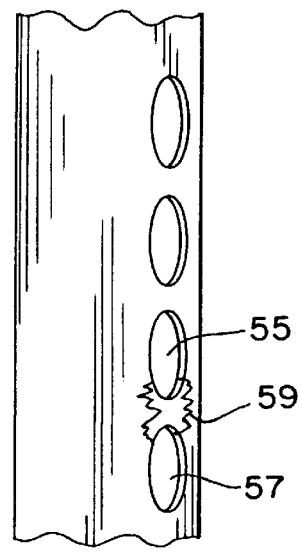
FIG. 7 is a slide view of a portion of a different movable tube illustrating how fractures of the tube could occur.

In addition to user convenience and more fine incremental adjustment, the orthogonal interleaving of the holes provides enhanced strength. In FIGS. 6 and 7, the spacing between adjacent holes is the same. In FIG. 6, those holes are orthogonally interleaved while in FIG. 7 the holes are located parallel to one another. In FIG. 7, with pin 53 in hole 55 and a particularly heavy load supported by the jack stand, hole 55 may break through to hole 57 along the fracture lines 59. In FIG. 6, with pin 53 in hole 61 and a particularly heavy load supported by the jack stand, hole 61 could break through to hole 63 along the fracture lines 65, however, this fracture line is far longer and the likelihood of such a failure far more remote. Similarly, in FIG. 7, with pin 53 in hole 53 and a particularly heavy load supported by the jack stand, hole 63 may break through to hole 67 along the fracture lines 69. Again, this fracture line is far longer and the likelihood of such a failure far more remote.

Figure 4:
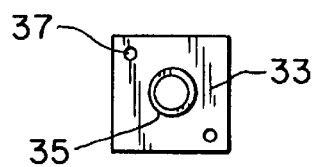
FIG. 4 is a bottom view of the movable tube and adapter plate of FIGS. 1 and 2.

The adapter plate 33 on the upper tube 35 is a ³⁄₁₆ inch flat iron piece, which is 3½ inches square as seen in FIG. 4. The adapter plate 33 is welded to the tube 35 which is a 1½ inch black iron pipe (or any kind of tube of appropriate diameter). Holes such as 37 are drilled through the plate 33 to mount the hydraulic jack 11 to the upper part of the stand. The hydraulic jack 11 should not be any greater capacity than 2 ton for safety reasons, so as not jack the vehicle off the lift.

FIGS. 1, 2 and 3 show an adapter 27 made to be optionally used in conjunction with the jack to provide more surface area to support the weight being jacked. This adaptor can be used or not used depending on what the jack is used for. It is made of ³⁄₁₆ inch flat iron 4½ inches long and 1½ inches wide and angled at each end as at 28 for better support. A one inch diameter pipe 25 which is ¾ inches in length is welded to the flat iron piece 27 midway. This adapter functions as a removable saddle for adapting the upper end of the ram to more securely support a convexly curved heavy object. It comprises an upwardly opening convex rest and a downwardly opening hollow cylindrical adapter sleeve 25 for passing over and laterally securing the saddle to an upper end 23 of the ram 21.

The pin 53 shown in FIG. 1 is ½ inch mild steel round stock 3½ inches in length and a ³⁄₁₆ inch hole drilled at one end to accept a smaller pin 54 for a handle. This pin 53 will connect the upper part to the lower part and support the weigh above. This pin also provides a quick and easy release to change elevations of the hydraulic jack 11.

The method of assembling a hydraulic jack stand of the invention should now be clear. If not already present, two holes such as 39 are drilled in the base 31 of the jack 11. A pair of bolts such as 29 are passed through holes in the adapter plate 33 and into base 31. The holes 39 may be tapped, or simply drilled and nuts may be used on the bolts 29. Tubular member 35 is moved along the axis 36 and into the tubular member 45. Pin 53 is passed through one of the holes 49 or 51 and one of the holes such as 52, 38 or 40 to fix the relative positions of the tubular members 35 and 45. The saddle 27 may then optionally be placed on the upper end 23 of the ram 21.

From the foregoing, it is now apparent that a novel hydraulic jack stand and a novel kit for assembling such a jack stand have been disclosed meeting the objects and advantageous features set out hereinbefore as well as others, and that numerous modifications as to the precise shapes, configurations and details may be made by those having ordinary skill in the art. For example, while both tubes 35 and 45 have been disclosed as hollow cylindrical tubes, the inner one may be solid, and both may be of a cross-section other than circular, square, for example. The kit may be packaged either with the jack 11, or that jack may be obtained by the customer separately. Either tube 35 or 45 may be provided with the plurality of holes and those holes need not be uniformly spaced so long as the largest separation between adjacent holes does not exceed the stroke of the jack ram 21 when only one hole is provided in the other tube. These as well as numerous other modifications may be made without departing from the spirit of the invention or the scope thereof as set out by the claims which follow.

What is claimed is:

1. A kit for adapting a commercially available hydraulic bottle jack for use at selectively adjustable relatively elevated locations comprising:
   a first elongated tubular member having a floor engaging base fixed on one end thereof, a first transverse aperture extending therethrough near the other end thereof, and a second transverse aperture longitudinally spaced from the first aperture and extending generally orthogonal thereto;
   a second elongated tubular member having a first set of generally parallel generally equally spaced transverse apertures and a second set of generally parallel generally equally spaced transverse apertures with the second set of apertures extending generally orthogonal to the first set, one of the elongated members having a transverse dimension sufficiently small that it may be telescopically slidingly received within the other tubular member;
   a jack adapter plate fixed to one end of the second elongated tubular member;
   a plurality of bolts for fastening a hydraulic jack to the jack adapter plate; and
   a pin adapted to extend simultaneously through said first elongated tubular member transverse aperture and a selected one of said first and second sets of apertures to fix the relative locations of the first and second elongated tubular members.

2. The kit of claim 1 further comprising a saddle for adapting an object engaging end of a movable ram portion of a hydraulic jack to support a convexly curved heavy object.

3. The kit of claim 2 wherein the saddle comprises an upwardly opening convex rest and a downwardly opening hollow cylindrical adapter for passing over and laterally securing the saddle to the object engaging end of the ram.

4. A kit for adapting a commercially available hydraulic bottle jack for use at selectively adjustable relatively elevated locations comprising:
   a first elongated tubular member having a floor engaging base fixed on one end thereof, a first transverse aperture extending therethrough near the other end thereof, and a second transverse aperture longitudinally spaced a first distance from the first aperture and extending generally orthogonal thereto;
   a second elongated tubular member having a first set of generally parallel generally equally spaced transverse apertures and a second set of generally parallel generally equally spaced transverse apertures with the second set of apertures extending generally orthogonal to the first set, each said aperture of said first set being longitudinally spaced a second distance from an adjacent one of said second set of apertures, said second distance being unequal to said first distance, the elongated members having a transverse dimension sufficiently small that it may be telescopically slidingly received within the other tubular member;
   a jack adapter plate fixed to one end of the second elongated tubular member;
   a plurality of bolts for fastening a hydraulic jack to the jack adapter plate; and
   a pin adapted to extend simultaneously through said first elongated tubular member transverse aperture and a selected one of said first and second sets of apertures to fix the relative locations of the first and second elongated tubular members.

5. The kit of claim 4 wherein said first distance is less than said second distance.

6. The kit of claim 5 wherein said second distance is less than twice said first distance.

* * * * *

UNITED STATES PATENT AND TRADEMARK OFFICE
CERTIFICATE OF CORRECTION

PATENT NO. : 6,027,102
DATED : February 22, 2000
INVENTOR(S) : Richard P. Krupa

It is certified that error appears in the above-identified patent and that said Letters Patent is hereby corrected as shown below:

Column 4

Line 34, after hole, delete "53" and substitute --63-- therefor.

Signed and Sealed this

Sixth Day of March, 2001

Attest:

NICHOLAS P. GODICI

Attesting Officer

Acting Director of the United States Patent and Trademark Office